J. E. LIMEBURNER.
AXIS INDEX FOR LENSES.
APPLICATION FILED MAR. 21, 1912.
1,099,927.
Patented June 16, 1914.
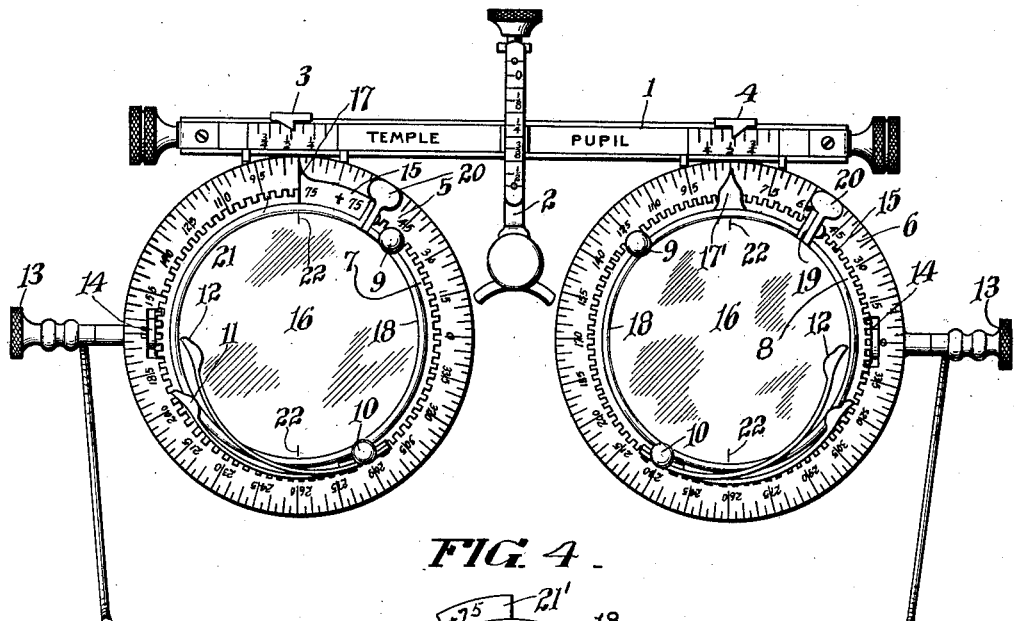
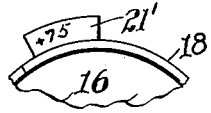
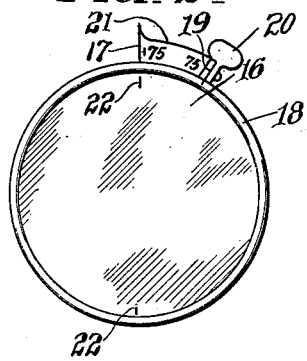
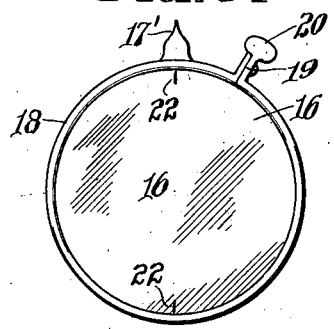
WITNESSES
INVENTOR
John E. Limeburner
BY
ATTORNEY

UNITED STATES PATENT OFFICE.

JOHN E. LIMEBURNER, OF SWARTHMORE, PENNSYLVANIA.

AXIS-INDEX FOR LENSES.

1,099,927.  Specification of Letters Patent.  Patented June 16, 1914.

Application filed March 21, 1912. Serial No. 685,340.

*To all whom it may concern:*

Be it known that I, JOHN E. LIMEBURNER, a citizen of the United States, residing at 742 Harvard avenue, Swarthmore, in the county of Delaware and State of Pennsylvania, have invented a certain new and useful Axis-Index for Lenses, of which the following is a specification.

The purpose of my invention is to provide an axis index which is rigidly connected with the mount of the lens.

A further purpose of my invention is to avoid one setting of the lens within a trial frame, reducing the time of operator and patient and also reducing the opportunity for errors.

A further purpose of my invention is to aline the index with the axis marking upon the lens within the laboratory or factory, rather than upon the test frame.

A further purpose of my invention is to simplify the construction and increase the accuracy of axis indication for lenses.

Further purposes of my invention will appear from the specification and the claims appended thereto.

I have preferred to illustrate my invention by some forms thereof, which I have found to be practical, convenient and inexpensive, and which at the same time well illustrate the principles of my invention.

In the drawings Figure 1 is a front elevation of a structure embodying two desirable forms of my invention. Figs. 2 and 3 are front elevations of the lenses and mounts shown in Fig. 1. Fig. 4 is a broken front elevation of another form of my invention.

It has been customary in the use of trial frames to set the lens in the frame with its axis mark as nearly as may be in alinement with an index or indicator carried by the rotatable lens carrier, and to determine the final position of the lens by subsequently reading the position of this index upon the annular scale. This has involved two settings during the use of the trial frame, with corresponding opportunity for error. Probability of error is much increased by the fact that the settings are made while the frame is worn by the patient.

I have aimed to eliminate one of the settings under these unfavorable conditions, with corresponding gain in time, simplicity and accuracy, by fastening an index to the lens during manufacture, or under the favorable conditions of laboratory work, preferably as a permanent fastening, and to use this index for the determination of the reading upon the annular trial frame scale.

In Fig. 1 I have illustrated the general structure of what is known as the Rhoads trial frame, having adjustable bar 1, adjustable nose piece 2, clamps 3 and 4, annular, non-rotatable scales 5 and 6, rotatable lens carriers 7, 8, posts 9, 10, lens clamps 11, front clamps 12, rotatable buttons 13 and gears 14, engaging with the teeth 15, upon the lens carriers. All of this structure is well known. I have supplied each lens 16 with its own axis index, showing two forms thereof, 17 and 17'. I have shown the index rigidly mounted upon the rim or frame 18 of the lens, which frame is retained about the lens in any suitable manner, as at 19, 19'. I have preferred to place a handle upon the lens frame and show this handle as an extension 20 of one side of the frame.

It will be evident that many forms of handle may be devised and located at any desired point about the circumference of the lens. The desirability of connecting it with the joint 19, lies in the fact that the form of joint preferred causes some extension from the circular continuity of the lens frame and provides convenient handle mount at this point, leaving approximately the entire circumference of the lens frame of uninterrupted circular continuity for insertion within the lens holder. It will be likewise evident that the handle may be combined or connected with the index, as in Fig. 2, where they are connected by any suitable web or member 21. The handle and index may be entirely disconnected as in Fig. 3. I prefer to locate them near together to leave as large a part as possible of the lens frame of circular form. It will be further evident that a wide variety of indexes may be used and that the method of their attachment to the lens rim or frame is wholly a matter of selection with the manufacturer.

In Fig. 1, I have shown one form of lens axis index in one of the carriers 7 and the other form illustrated in 8.

It will be evident that the extension whose edge or point forms the axis index may itself form the handle for the lens and lens frame, as indicated in the construction shown at 21' in Fig. 4.

Where the lens index is to extend from the lens rim or frame, the marking of the axis of the lens, as at 22, may be made very minute and confined approximately to the edge of the lens, since its alinement with the index will be secured under the most favorable circumstances of available time, light, room and laboratory or factory equipment. Moreover, the axis index being in approximately the same plane as the markings 22, can be made to aline with the markings very accurately.

In operation the lens need not be preliminarily adjusted in the revolving lens holder of the testing frame to bring it into line with any markings upon the rotatable lens holder, but can be placed in any position within the lens holder, and adjustment to meet the conditions of the eye being tested can be begun at once. When the lens has been turned to the correct position, the angle with respect to the axis, can be read directly from the index against the annular scale.

Having thus described my invention, what I claim as new and desire to secure by Letters Patent is—

1. In a device of the character stated, a frame having angular scales thereon, a trial lens holder rotatable in the frame, a trial lens removably supported in said holder, a rim surrounding the lens and rigidly secured with respect to it, and an axis index for the lens secured to the rim and projecting therefrom.

2. In a device of the character stated, a frame having angular scales thereon, a trial lens holder rotatable in the frame, a trial lens removably supported in said holder, and an axillary index in fixed position therewith and exterior to the diameter of the lens.

3. In a device of the character stated, a frame having angular scales thereon, a trial lens holder rotatable in the frame, a trial lens removably supported in said holder, a rim about the lens and rigidly secured to it, a handle upon the rim and an axis index for the lens in fixed position relative to the handle.

4. In a device of the character stated, a frame having angular scales thereon, a trial lens holder rotatable in the frame, a trial lens removably supported in said holder, a lens rim about the lens and rigidly secured to it and a combined lens axis index and handle connected with the frame.

JOHN E. LIMEBURNER.

Witnesses:
HELEN I. KAUFFMAN,
WM. STEELL JACKSON.

---

Copies of this patent may be obtained for five cents each, by addressing the "Commissioner of Patents, Washington, D. C."